(12) United States Patent
Kawakatsu

(10) Patent No.: US 7,847,953 B2
(45) Date of Patent: Dec. 7, 2010

(54) HOMODYNE LASER INTERFEROMETER PROBE AND DISPLACEMENT MEASUREMENT SYSTEM USING THE SAME

(75) Inventor: Hideki Kawakatsu, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 436 days.

(21) Appl. No.: 11/817,438

(22) PCT Filed: Mar. 2, 2006

(86) PCT No.: PCT/JP2006/303935
§ 371 (c)(1),
(2), (4) Date: Feb. 29, 2008

(87) PCT Pub. No.: WO2006/093210
PCT Pub. Date: Sep. 8, 2006

(65) Prior Publication Data
US 2009/0079990 A1 Mar. 26, 2009

(30) Foreign Application Priority Data
Mar. 2, 2005 (JP) .............................. 2005-056753

(51) Int. Cl.
*G01B 9/02* (2006.01)
*G01B 11/02* (2006.01)
(52) U.S. Cl. ...................... 356/501; 356/482
(58) Field of Classification Search ................ 356/498, 356/501, 493, 482
See application file for complete search history.

(56) References Cited
U.S. PATENT DOCUMENTS
5,388,115 A * 2/1995 Kawashima et al. .......... 372/24
7,545,508 B2 * 6/2009 Kawakatsu ................. 356/501

FOREIGN PATENT DOCUMENTS
JP 6 185977 7/1994
JP 2003 114182 4/2003

* cited by examiner

Primary Examiner—Patrick J Connolly
(74) Attorney, Agent, or Firm—Oblon, Spivak, McClelland, Maier & Neustadt, L.L.P.

(57) ABSTRACT

A low-cost homodyne laser interferometer probe of simple structure is provided which allows predetermined performance to be easily obtained by a simple adjustment, and a displacement measurement system using the same is also disclosed. The homodyne laser interferometer probe includes an optical fiber (1) for guiding light, a collimator lens (2) that receives the light from the optical fiber (1), a ¼ wavelength plate (3) that receives light from the collimator lens (2) and that converts the light from linearly polarized light into circularly polarized light, a beam splitter (4) for dividing light from the ¼ wavelength plate (3) into reference light and measurement light, a first focal lens (5) that receives the reference light from the beam splitter (4), a reflection mirror (6) for reflecting the reference light from the first focal lens (5), and a second focal lens (7) that receives the measurement light from the beam splitter (4). Here, the reference light from the reflection mirror (6) is returned to measurement means along the same route. The measurement light from the second focal lens (7) is applied to a measurement object (8), and the measurement light (signal light) from the measurement object (8) is returned to the measurement means along the same route.

8 Claims, 9 Drawing Sheets

HOMODYNE LASER INTERFEROMETER PROBE AND DISPLACEMENT MEASUREMENT SYSTEM USING THE SAME

TECHNICAL FIELD

The present invention relates to a homodyne laser interferometer probe and a displacement measurement system using the same.

BACKGROUND ART

The conventional displacement measurement systems for cantilever(s) in a scanning force microscope include:

(1) the optical lever system;

(2) the homodyne interferometer system using an end face of an optical fiber;

(3) the Fabry-Perot homodyne interferometer system using a concave lens;

(4) the heterodyne laser Doppler meter system; and (5) the homodyne interferometer system that reflects reference light using only a plane mirror without employing any focal lens.

[Patent Document 1] Japanese Unexamined Patent Application Publication No. 2003-114182

[Patent Document 2] WO 2004/017329

[Non-patent Document 1] J. Yang et al., "Ultra-small single crystal silicon cantilevers for a new generation of SFM"

[Non-patent Document 2] Hans J. Hug et al., "Scanning Force Microscopy with Ultrasmall Cantilevers"

DISCLOSURE OF INVENTION

The above-described conventional displacement measurement systems involve their respective problems as follows:

(1) For the optical lever system, the adjustment of an optical axis is complicated and it is difficult to use this system especially in a liquid, in a vacuum, or at a low temperature.

(2) The homodyne interferometer system using an end face of the optical fiber is widely used, but the signal intensity in this system is low because this system uses, as reference light, reflection light occurring on an end face of the optical fiber and having a quantity equal to 4 percent of that of the incident light. Also, if the fiber is used in the as-is status of being cut out, the diameter of the end face thereof is several hundreds of micrometers, and therefore, this system is unsuitable for the measurement of minute cantilever(s).

(3) The Fabry-Perot homodyne interferometer system has a high sensitivity, but this system cannot obtain improved performance unless the coaxiality between the concave lens and an optical fiber is compensated for, on the order of sub-micron.

(4) The heterodyne laser Doppler meter system is suitable for the usage in a higher frequency range, but very expensive.

(5) The homodyne interferometer system has problems in that it is difficult to adjust a light axis for delivering performance in this system.

In view of the above-described circumstances, the present invention provides a low-cost homodyne laser interferometer probe of simple structure allowing predetermined performance to be easily obtained by a simple adjustment, and also provide a displacement measurement system using the same.

To achieve the above-described object, the present invention is characterized by the following.

[1] A homodyne laser interferometer probe includes an optical fiber for guiding light, a collimator lens that receives the light from the optical fiber, a ¼ wavelength plate that receives the light from the collimator lens and converts the light from linearly polarized light to circularly polarized light, a beam splitter for dividing the light from the ¼ wavelength plate into reference light and measurement light, a first focal lens that receives the reference light from the beam splitter, a reflection mirror for reflecting the reference light from the first focal lens, and a second focal lens that receives the measurement light from the beam splitter. Here, the reference light from the reflection mirror is returned to measurement means along the same route. The measurement light from the second focal lens is applied to a measurement object and the measurement light from the measurement object is returned to the measurement means along the same route.

[2] A homodyne laser interferometer probe includes an optical fiber for guiding light; a collimator lens that receives the light from the optical fiber; a beam splitter that receives the light from the collimator lens and divides the light into reference light and measurement light; a first focal lens that receives the reference light from the beam splitter; a reflection mirror for reflecting the reference light from the first focal lens; a second focal lens that receives the measurement light from the beam splitter; and a photodetector that applies the measurement light from the second focal lens to a measurement object, that returns the measurement light reflected by the measurement object to the beam splitter, and measures the measurement light from the beam splitter via a third focal lens, as well as measures the reference light from the reflection mirror along the same route.

[3] In the homodyne laser interferometer probe described in the above [2], the photodetector is a photodiode.

[4] In the homodyne laser interferometer probe described in the above [2], the photodetector is a photodiode connected to the focus part of the third focal lens, via an optical fiber.

[5] In the homodyne laser interferometer probe described in the above [1] or [2], an adjustment mechanism is provided that adjusts the distance between the first focal lens and the beam splitter while keeping constant the distance between the first focal lens that receives the reference light from the beam splitter and the reflection mirror that receives the reference light from the first focal lens and reflects it.

[6] In the homodyne laser interferometer probe described in the above [5], the adjustment mechanism is a shear piezo element.

[7] In the homodyne laser interferometer probe described in the above [5], the adjustment mechanism consists of a shear piezo element and wedges.

[8] A displacement measurement system using the homodyne laser interferometer probe set forth in the above [1] is provided, that introduces the reference light and the measurement light that have been returned to the optical fiber, into an element for detecting the intensity of light that mutually interferes through the intermediary of a beam splitter, and that performs homodyne interferometer measurement using the optical path difference between the measurement light and the reference light.

[9] A displacement measurement system using the homodyne laser interferometer probe described in the above [2] is provided, that performs a homodyne laser interferometer measurement by the optical path difference between the reference light and the measurement light, based on the reference light and the measurement light obtained by the photodetector.

BEST MODE FOR CARRYING OUT THE INVENTION

The homodyne laser interferometer probe according to the present invention includes an optical fiber for guiding light, a collimator lens that receives the light from the optical fiber, a ¼ wavelength plate that receives the light from the collimator lens and converts the light from the linearly polarized light to circularly polarized light, a beam splitter for dividing the light from the ¼ wavelength plate into reference light and measurement light, a first focal lens that receives the reference light from the beam splitter, a reflection mirror for reflecting the reference light from the first focal lens, and a second focal lens that receives the measurement light from the beam splitter. Here, the reference light from the reflection mirror is returned to measurement means along the same route. The measurement light from the second focal lens is applied to a measurement object, and the measurement light from the measurement object is returned to the measurement means along the same route.

EMBODIMENTS

Hereinafter, embodiments according to the present invention are described in detail.

Figure 1:
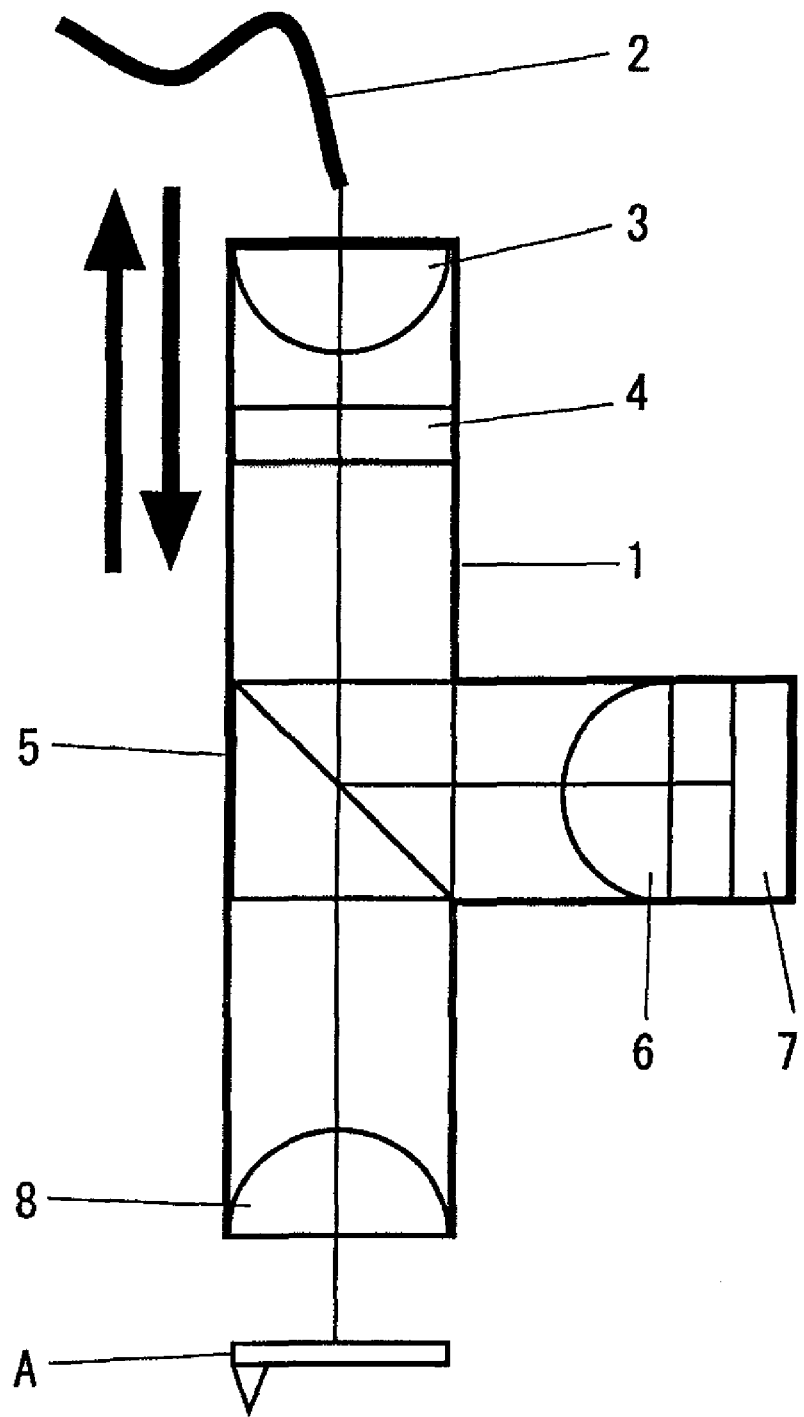
FIG. 1 is a schematic diagram of a homodyne laser interferometer probe according to a first embodiment of the present invention.

FIG. 1 is a schematic diagram of a homodyne laser interferometer probe according to a first embodiment of the present invention.

In FIG. 1, reference numeral 1 denotes an optical probe (homodyne laser interferometer probe body: T-typed metal column), 2 denotes an optical fiber into which measurement/reference light is introduced and from which the measurement/reference light is led out, 3 denotes a collimator lens that receives the measurement/reference light from the optical fiber 2 and leads out the measurement/reference light to the optical fiber 2, 4 denotes a ¼ wavelength plate that receives the measurement/reference light from the collimator lens 3 and emits the measurement/reference light to the collimator lens 3, 5 denotes a beam splitter that, after having received the measurement/reference light from the ¼ wavelength plate 4, reflects the reference light, and emits the reference light to a first focal lens 6 as well as transmissively emits the measurement light, 7 denotes a reflection mirror that receives the reference light from the first focal lens 6 and that reflects it, 8 denotes a second focal lens that receives the measurement light, which is the transmitted light from the beam splitter 5. Here, A denotes a measurement object (e.g., cantilever) to which the measurement light from the second focal lens 8 is applied. The measurement light (signal light) reflected by the displacement measurement object (e.g., cantilever) A returns to the optical fiber 2 along the same route.

In the present invention, a homodyne laser interferometer probe having an optical system with such a construction is used. The especially important thing here is that the first focal lens 6 is used between the beam splitter 5 and the reflection mirror 7.

Of the above-described constituents, the constituents other than measurement object A are contained in the optical probe (homodyne laser interferometer probe body: metal column) 1 having a volume (diameter: about 10 mm, length: about 50 mm).

Thus, light introduced by the optical fiber 2 is made into parallel light by the collimator lens 3, converted from linearly polarized light into circular polarized light by the ¼ wavelength plate 4, and divided into measurement light and reference light by the beam splitter 5. The reference light passes through the first focal lens 6, and is applied to the reflection mirror 7 located at the focal position of the first focal lens 6. The reference light reflected by the reflection mirror 7 returns to a measurement device (not shown) along the same route.

On the other hand, the measurement light that has passed through the beam splitter 5 is applied, through the second focal lens 8, to the measurement object (cantilever in this case) A located in the vicinity of the focal position of the second focal lens 8, and the measurement light (signal light) from the measurement object A returns to the measurement device along the same route via the optical fiber 2. In the measurement device, interference occurs based on the difference in optical path between the reference light and the measurement light that have been returned, so that the displacement of the measurement object A can be measured by detecting the change in the lightness/darkness of the interference. Specifically, the light, interfering every time the optical path difference between the reference light and the measurement light makes a change by a half wavelength of light, makes periodical changes between bright interference and dark interference. These changes show the displacement of the displacement measurement object. In particular, making the intermediate point between the bright interference and the dark interference an operation point, allows a minute displacement on the order of nanometer around the operation point, to be measured with high sensitivity.

Figure 2:
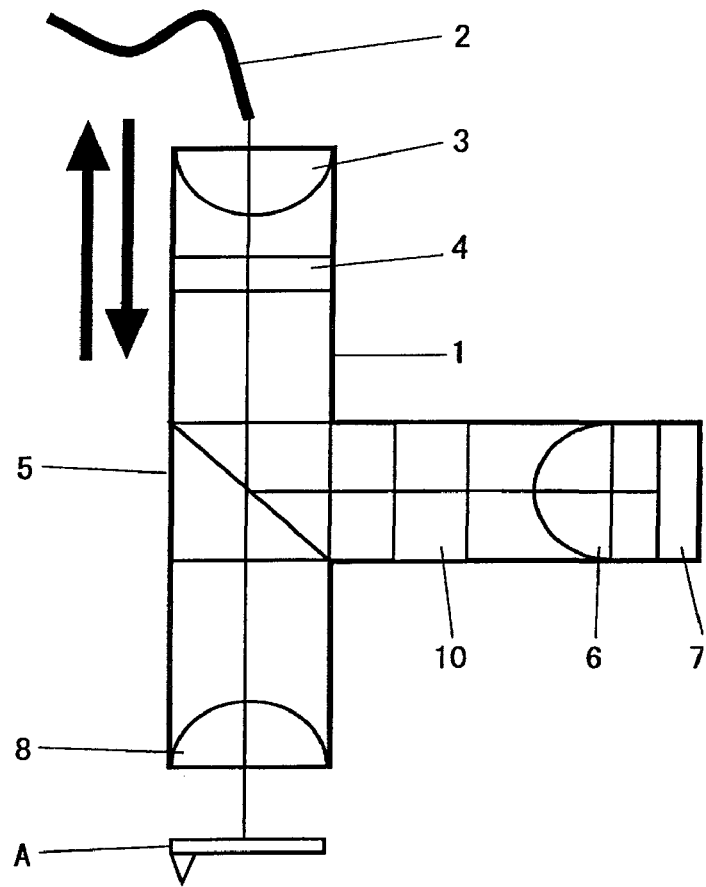
FIG. 2 is a schematic diagram of a homodyne laser interferometer probe according to a second embodiment of the present invention.

FIG. 2 is a schematic diagram of a homodyne laser interferometer probe according to a second embodiment of the present invention.

In this embodiment, there is provided an adjustment mechanism that adjusts the distance between the first focal lens 6 and the beam splitter 5 (e.g., a piezo element 10) while keeping constant the distance between the first focal lens 6 that receives the reference light, which is reflection light from the beam splitter 5, and the reflection mirror 7, which receives the reference light from the first focal lens and reflects it. Here, the drive portion of the piezo element 10 may be an ordinary one and is not shown in the figure.

Thus, the driving of the adjustment mechanism, e.g., a piezo element 10, allows a finer setting of the second focal lens 8 with respect to the measurement object A by adjusting the distance between the first focal lens 6 and the beam splitter 5.

Figure 3:
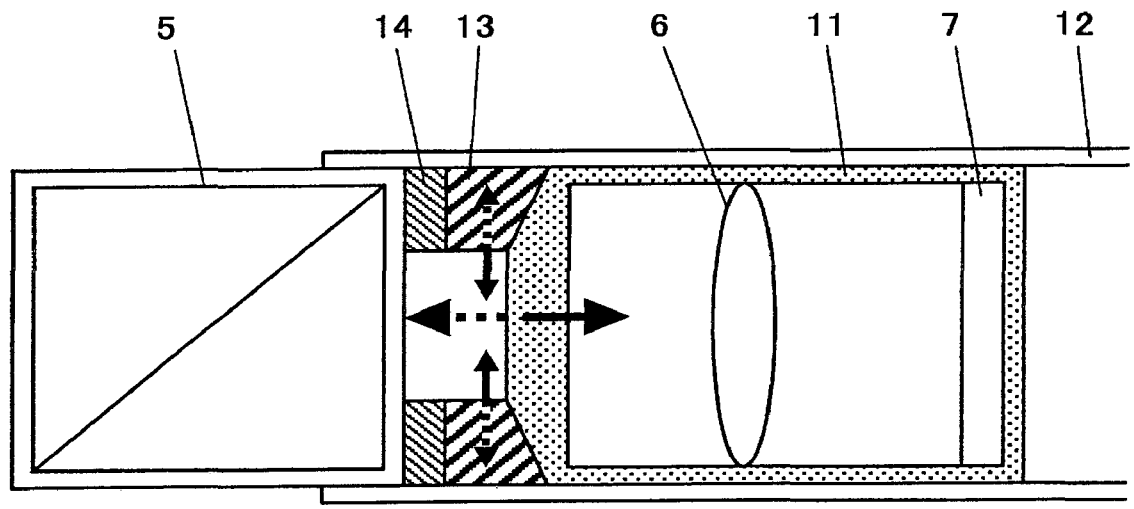
FIG. 3 illustrates an example of an adjustment mechanism that adjusts the distance between a first focal lens and a beam splitter while keeping constant the distance between the first focal lens and a reflection mirror in a homodyne laser interferometer probe embodied in the second embodiment of the present invention.

FIG. 3 illustrates an example of the adjustment mechanism that adjusts the distance between the first focal lens and the beam splitter while keeping constant the distance between the first focal lens and the reflection mirror in a homodyne laser interferometer probe embodied in the second embodiment of the present invention.

In FIG. 3, reference numeral 11 denotes a holder for fixing together the reflection mirror 7 and the first focal lens 6. The holder 11 has a pair of wedges 13 by which the shear piezo element 14 is fixed to the holder 11. The holder 11 is arranged to be removable linearly (leftward and rightward in the figure) along a guide 12.

When the shear piezo element 14 is driven and the pair of wedges 13 move inward (solid lines), the holder 11 minutely moves to the right. Then from this situation, the shear piezo element 14 is driven and the pair of wedge 13 moves outward (dotted lines), and the holder 11 minutely moves to the left. The holder 11 is kept under restraint in moving in directions other than the sliding direction thereof, by means of the guide 12, the wedges 13, the self weight thereof, springs, magnets, roller bearings, etc. The wedges 13 are pressed against the beam splitter 5 by the self weight thereof, springs, magnets, etc.

Such an adjustment mechanism (shear movement mechanism) has, in itself, a movement resolution on the order of 10 nm, but the use of the wedges 13 allows the movement resolution to be improved up to the sub-nanometer order. Furthermore, because this adjustment mechanism directly uses the beam splitter 5 as the reference plane of movement, very high rigidity, mechanical stability and optical stability are ensured, thereby providing a stable mechanism that requires no readjustment for a longer time after having adjusted the optical path difference.

Figure 4:
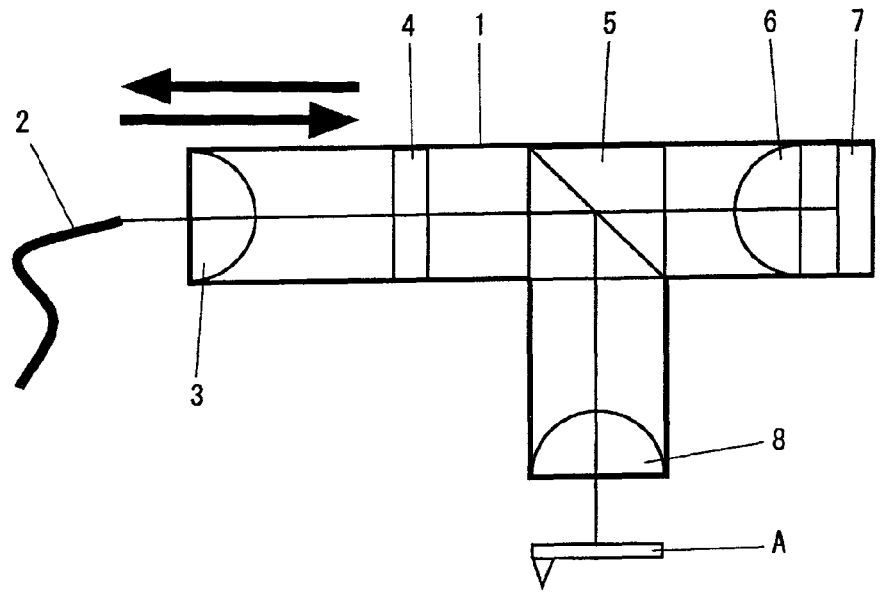
FIG. 4 illustrates a modification of the homodyne laser interferometer probe (FIG. 1) according to the first embodiment of the present invention.

FIG. 4 illustrates a modification of the homodyne laser interferometer probe (FIG. 1) according to the first embodiment of the present invention.

In the above-described first and second embodiments, there are provided the first focal lens 6 that receives the reference light, which is reflection light from the beam splitter 5, the reflection mirror 7 that receives the reference light from the first focal lens 6 and reflects it, and the second focal lens 8 that receives the measurement light, which is transmitted light from the beam splitter 5. However, since the beam splitter 5 has merely the function of dividing the light introduced by the optical fiber 2 into the measurement light and the reference light, the arrangement may be such that, as shown in FIG. 4, there are provided the first focal lens 6 that receives the reference light, which is the transmitted light from the beam splitter 5, the reflection mirror 7 that receives the reference light from the first focal lens 6 and reflects it, and the second focal lens 8 that receives the measurement light, which is the reflection light from the beam splitter 5.

Figure 5:
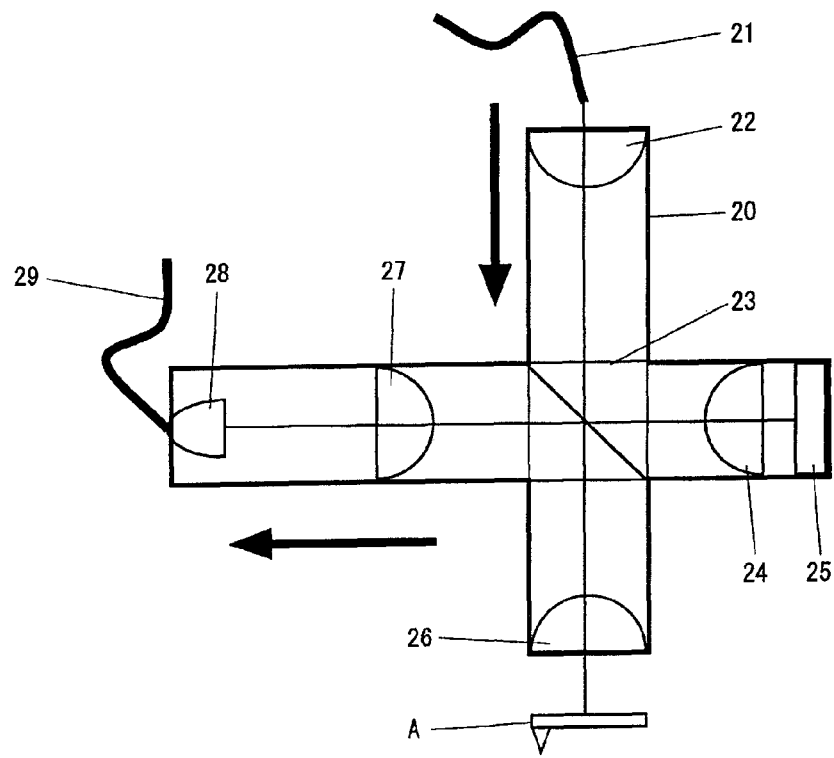
FIG. 5 is a schematic diagram of a homodyne laser interferometer probe according to a third embodiment of the present invention.

FIG. 5 is a schematic diagram of a homodyne laser interferometer probe according to a third embodiment of the present invention.

In FIG. 5, reference numeral 20 denotes an optical probe (homodyne laser interferometer probe body: cruciform metal column), 21 denotes an optical fiber, 22 denotes a collimator lens, 23 denotes a beam splitter, 24 denotes a first focal lens, 25 denotes a reflection mirror, 26 denotes a second focal lens, 27 denotes a third focal lens, 28 denotes a photodiode, 29 denotes wiring, and A denotes a displacement measurement object.

In this embodiment, light is introduced from the optical probe 21 through the collimator lens 22 into the beam splitter 23. The brightness/darkness of interference occurring based on the optical path difference between the measurement light and the reference light is directly measured by the photodiode 28 through the third focal lens 27 arranged in the optical probe 20. Thus, the optical probe 21 is used so as to propagate light only in a one-way direction. This arrangement requires no ¼ wavelength plate.

Figure 6:
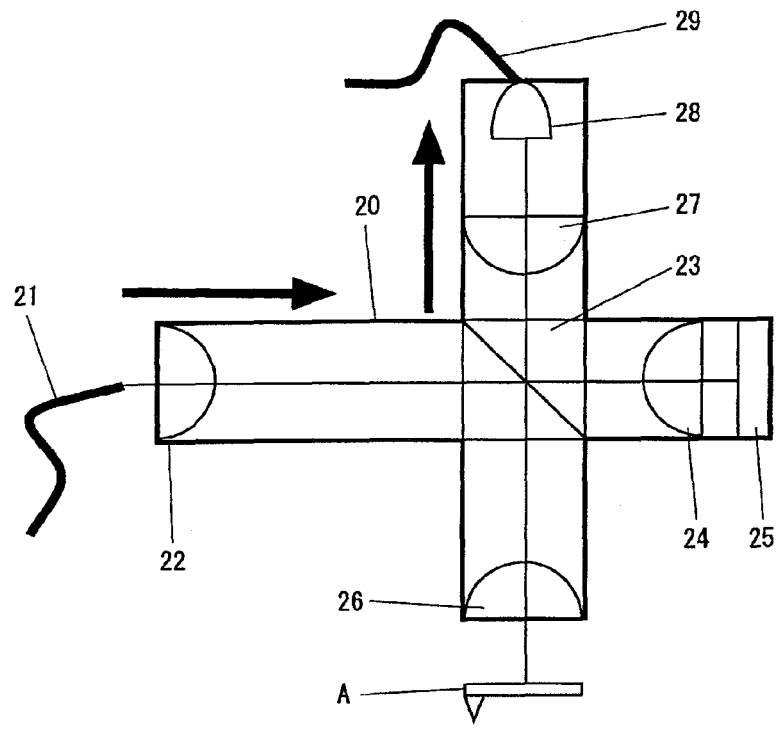
FIG. 6 illustrates a modification of the homodyne laser interferometer probe (FIG. 5) according to the third embodiment of the present invention.

FIG. 6 illustrates a modification of the homodyne laser interferometer probe (FIG. 5) according to the third embodiment of the present invention.

In the above-described third embodiment (FIG. 5), there are provided the first focal lens 24 that receives the reference light, which is reflection light from the beam splitter 23, the reflection mirror 25 that receives the reference light from the first focal lens 24 and that reflects it, and the second focal lens 26 that receives the measurement light, which is transmitted light from the beam splitter 23. However, since the beam splitter 23 has merely the function of dividing the light introduced by the optical fiber 21 into the measurement light and the reference light, the arrangement may be such that, as shown in FIG. 6, there are provided the first focal lens 24 that receives the reference light, which is the transmitted light from the beam splitter 23, the reflection mirror 25 that receives the reference light from the first focal lens 24 and that reflects it, and the second focal lens 26 that receives the measurement light, which is the reflection light from the beam splitter 23.

Figure 7:
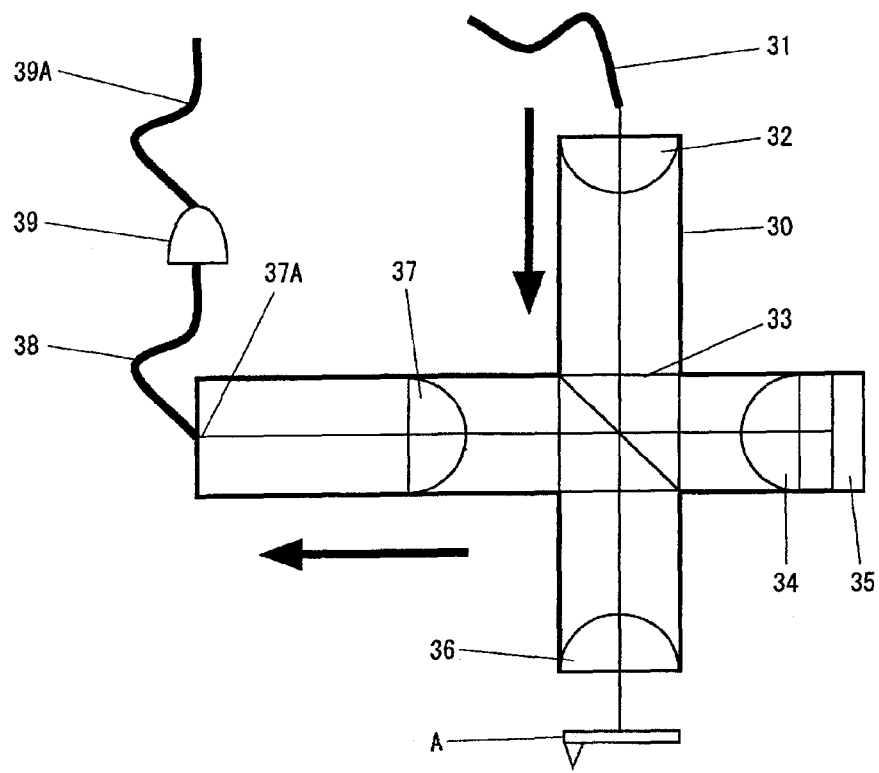
FIG. 7 a schematic diagram of a homodyne laser interferometer probe according to a fourth embodiment of the present invention.

FIG. 7 is a schematic diagram of a homodyne laser interferometer probe according to a fourth embodiment of the present invention.

In FIG. 7, reference numeral 30 denotes an optical probe (homodyne laser interferometer probe body: cruciform metal column), 31 denotes an first optical fiber, 32 denotes a collimator lens, 33 denotes a beam splitter, 34 denotes a first focal lens, 35 denotes a reflection mirror, 36 denotes a second focal lens, 37 denotes a third focal lens, 37A denotes the focus of the third focal lens, 38 denotes a second optical fiber, 39 denotes a photodiode, 39A denotes wiring, and A denotes a displacement measurement object.

In this embodiment, the second optical fiber 38 is arranged at the focal position 37A of the third focal lens 37, and by using it, the brightness/darkness of light by interference is introduced into the photodiode 39 arranged outside the optical probe 30.

With this arrangement, for example, using the first optical fiber 31 and the second optical fiber 38, it is possible to dispose only the first optical fiber 31, the second optical fiber 38, and the optical probe 30 in a vacuum by straddling the barrier between different atmospheres such as the vacuum and the air. This arrangement also requires no ¼ wavelength plate.

Figure 8:
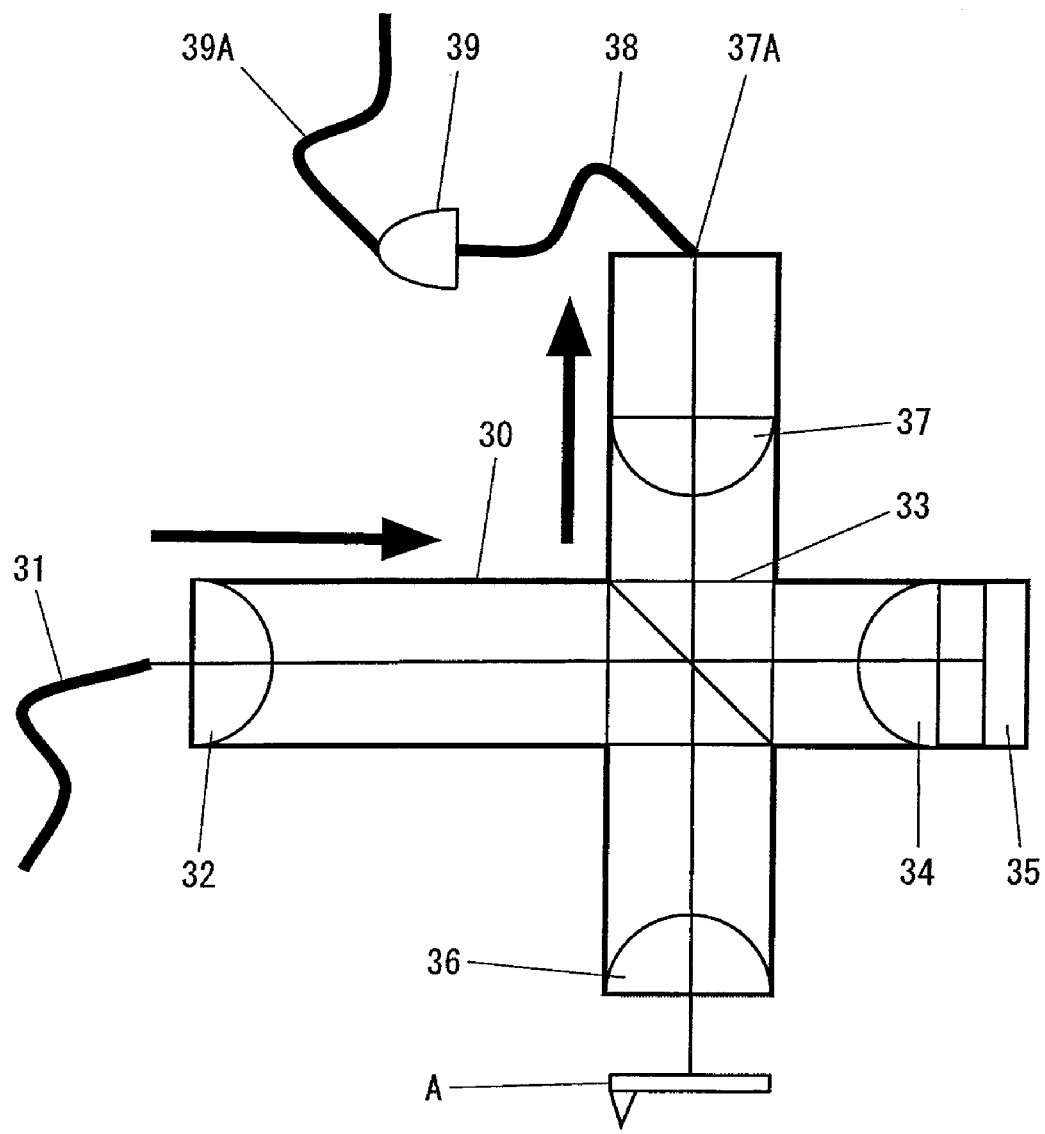
FIG. 8 illustrates a modification of the homodyne laser interferometer probe (FIG. 7) according to the fourth embodiment of the present invention.

FIG. 8 is a modification of the homodyne laser interferometer probe (FIG. 7) according to the fourth embodiment of the present invention.

In the above-described fourth embodiment (FIG. 7), there are provided the first focal lens 34 that receives the reference light, which is reflection light from the beam splitter 33, the reflection mirror 35 that receives the reference light from the first focal lens 34 and reflects it, and the second focal lens 36 that receives the measurement light, which is transmitted light from the beam splitter 33. However, since the beam splitter 33 has merely the function of dividing the light introduced by the optical fiber 31 into the measurement light and the reference light, the arrangement may be such that, as shown in FIG. 8, there are provided the first focal lens 34 that receives the reference light, which is the transmitted light from the beam splitter 33, the reflection mirror 35 that receives the reference light from the first focal lens 34 and that reflects it, and the second focal lens 36 that receives the measurement light, which is the reflection light from the beam splitter 33.

Next, displacement measurement systems having a homodyne laser interferometer probe is described.

Figure 9:
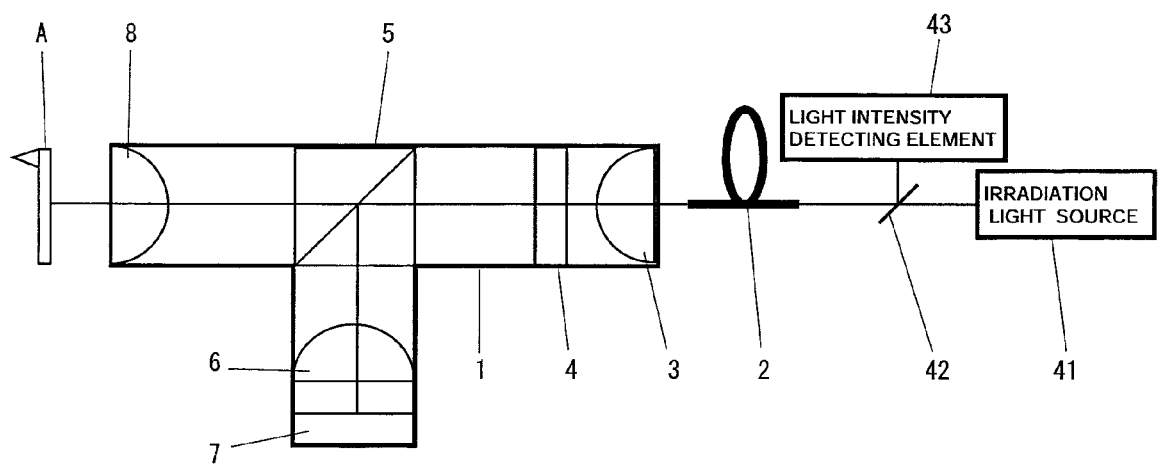
FIG. 9 is a schematic diagram of a displacement measurement system for a cantilever in a scanning force microscope having a homodyne laser interferometer probe according to the first embodiment of the present invention.

FIG. 9 is a schematic diagram of a displacement measurement system for a cantilever in a scanning force microscope having the homodyne laser interferometer probe (FIG. 1) according to the first embodiment of the present invention.

In FIG. 9, the construction of the homodyne laser interferometer probe is the same as those described above. Here, reference numeral 41 denotes an irradiation light source, 42 denotes a beam splitter, and 43 denotes an element (photodiode) for detecting the intensity of interference light.

As shown in FIG. 9, light applied by the irradiation light source 41 passes through the beam splitter 42, and is introduced into the optical fiber 2. Then, the light is made into parallel light by the collimator lens 3, converted from linearly polarized light into circularly polarized light by the ¼ wavelength plate 4, and divided into measurement light and reference light by the beam splitter 5. The reference light passes through the first focal lens 6, and is applied to the reflection mirror 7 located at the focal position of the first focal lens 6. The reference light reflected by the reflection mirror 7 is reflected by the beam splitter 5, and converted from the circularly polarized light to the linearly polarized light through the ¼ wavelength plate 4. Then, the reference light is reflected by the beam splitter 42 via the collimator lens 3—optical fiber 2 and introduced into an element (photodiode) 43 for detecting the intensity of mutually interfering light. On the other hand, the measurement light that has passed through the beam splitter 5 is applied, through the second focal lens 8, to the displacement measurement object (cantilever in this case) 9 located in the vicinity of the focal position of the second focal lens 8. The measurement light (signal light) from the measurement object 9 is introduced into the second focal lens 8, the beam splitter 5, the ¼ wavelength plate 4, the collimator lens 3 and the optical fiber 2 in this order. Then, the measurement light is reflected by the beam splitter 42, and introduced into an element (photodiode) 43 for detecting the intensity of reference light. That is, the lightness/darkness of interference occurring based on the optical path difference between the reference light and measurement light that have been returned, is introduced into the element (photodiode) 43 for detecting the intensity of the light that mutually interferes through the intermediary of the beam splitter 42. Based on the change in the output of this element (photodiode) 43 for detecting the intensity of this interference light, the displacement of the measurement object 9 is measured.

The displacement measurement system for a cantilever in the scanning force microscope may additionally include an adjustment mechanism (described later) for adjusting the distance between the first focal lens 6 and the beam splitter 5, as well.

Figure 10:
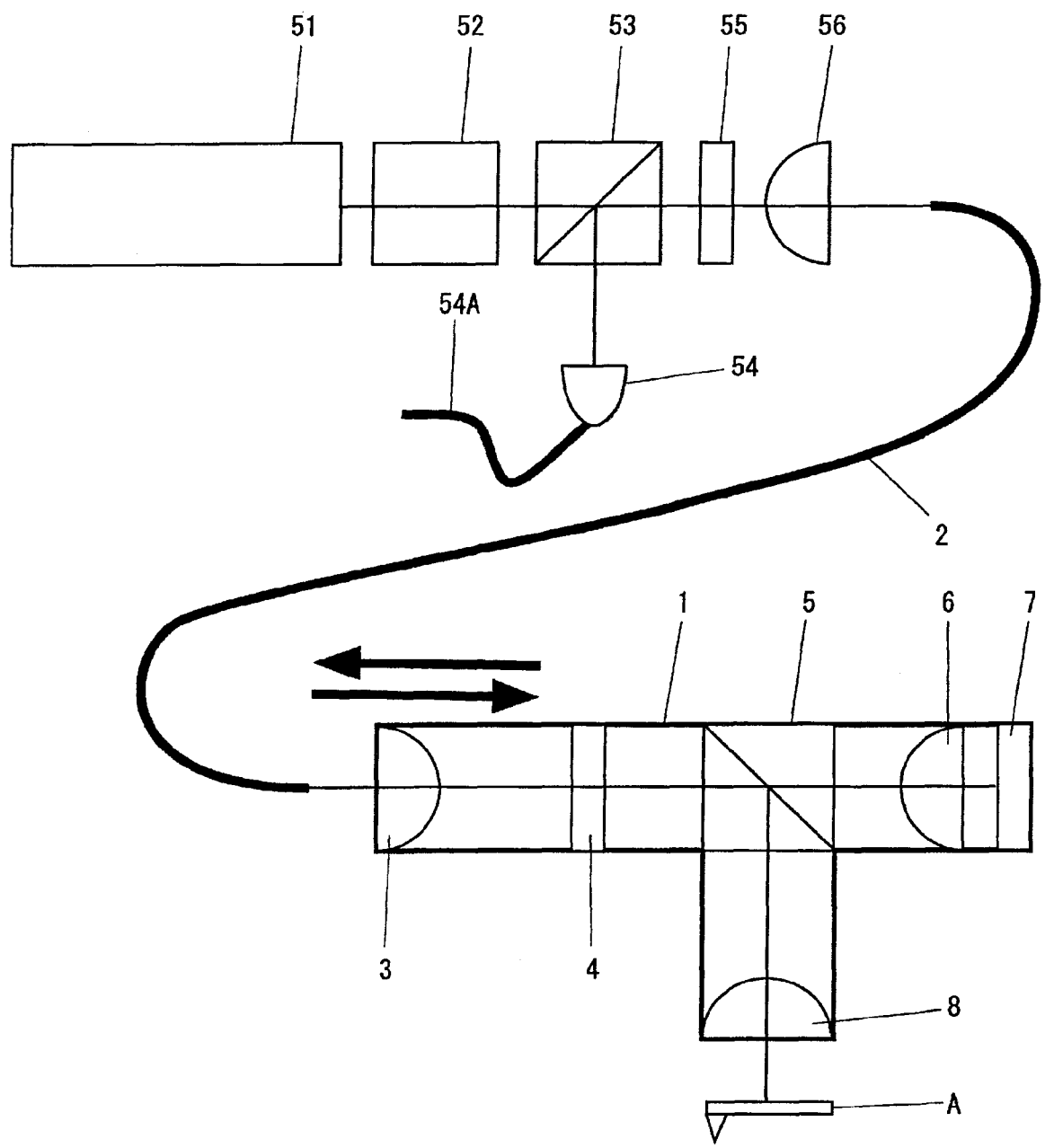
FIG. 10 is a schematic diagram of a displacement measurement system for a cantilever in a scanning force microscope corresponding to a homodyne laser interferometer probe (FIG. 4) according to the second embodiment of the present invention.

FIG. 10 is a schematic diagram of a displacement measurement system for a cantilever in a scanning force microscope corresponding to a homodyne laser interferometer probe (FIG. 4) according to the second embodiment of the present invention.

In this embodiment, the homodyne laser interferometer probe has a construction shown in FIG. 4. Here, laser light from the laser light source 51 is guided by the optical fiber 2 through a light isolator 52, a beam splitter 53, a ½ wavelength plate 55, and a focal lens 56, and inputted into the homodyne laser interferometer probe 1 (FIG. 4). The output from the optical probe 1 is led out from the optical fiber 2, and after having been reflected by the beam splitter 53, it is outputted, as a displacement signal, from the wiring 54A through the photodiode 54.

Figure 11:
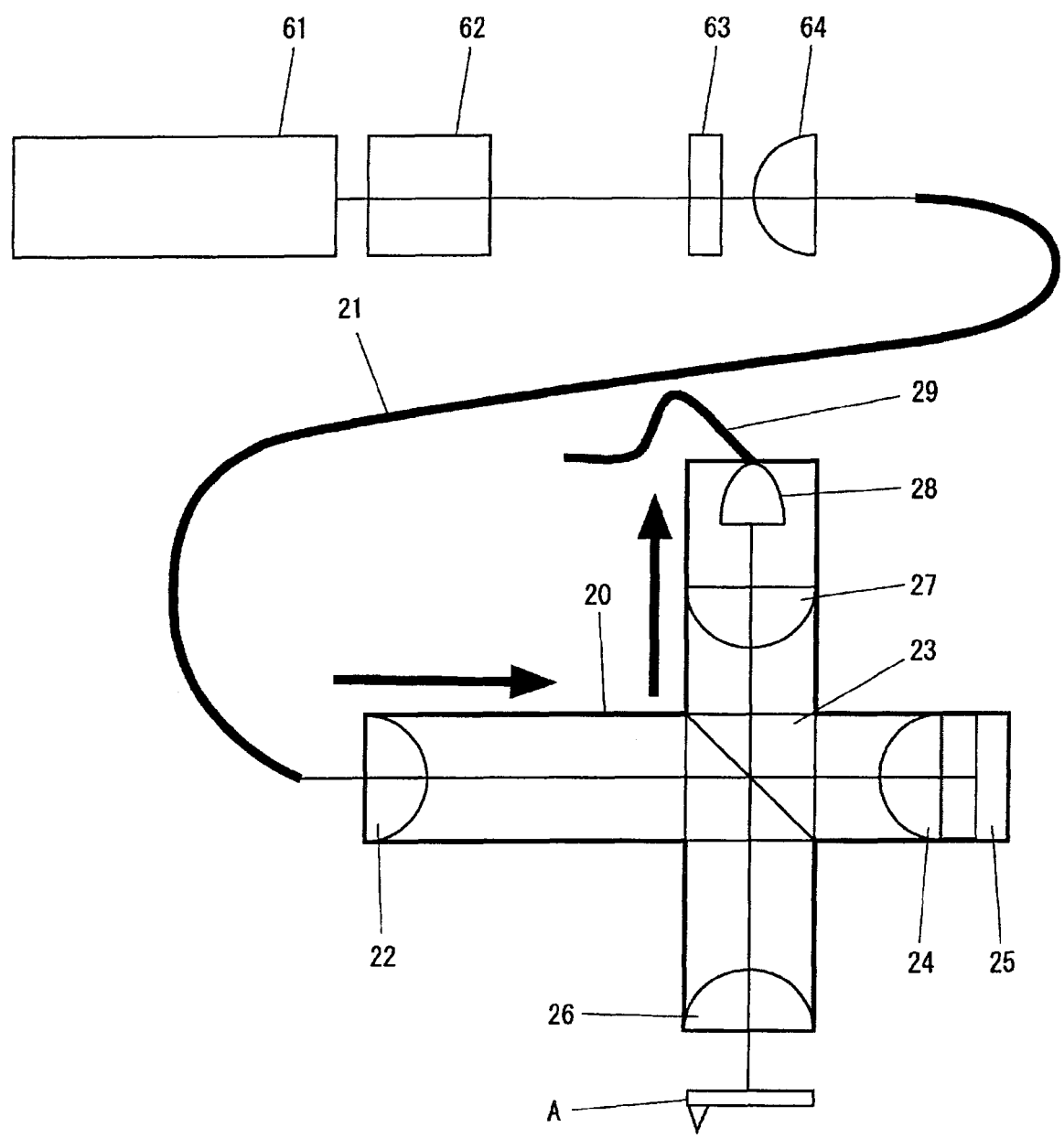
FIG. 11 is a schematic diagram of a displacement measurement system for a cantilever in a scanning force microscope corresponding to a homodyne laser interferometer probe (FIG. 6) according to the third embodiment of the present invention.

FIG. 11 is a schematic diagram of a displacement measurement system for a cantilever in a scanning force microscope corresponding to a homodyne laser interferometer probe (FIG. 6) according to the third embodiment of the present invention.

In FIG. 11, the homodyne laser interferometer probe has the construction shown in FIG. 6. Here, laser light from the laser light source 61 is guided by the optical fiber 21 through a light isolator 62, a ½ wavelength plate 63, and a focal lens 64, and introduced into the optical probe 20. The output light from the optical probe 20 is taken out by the wiring 29, as a displacement signal.

Figure 12:
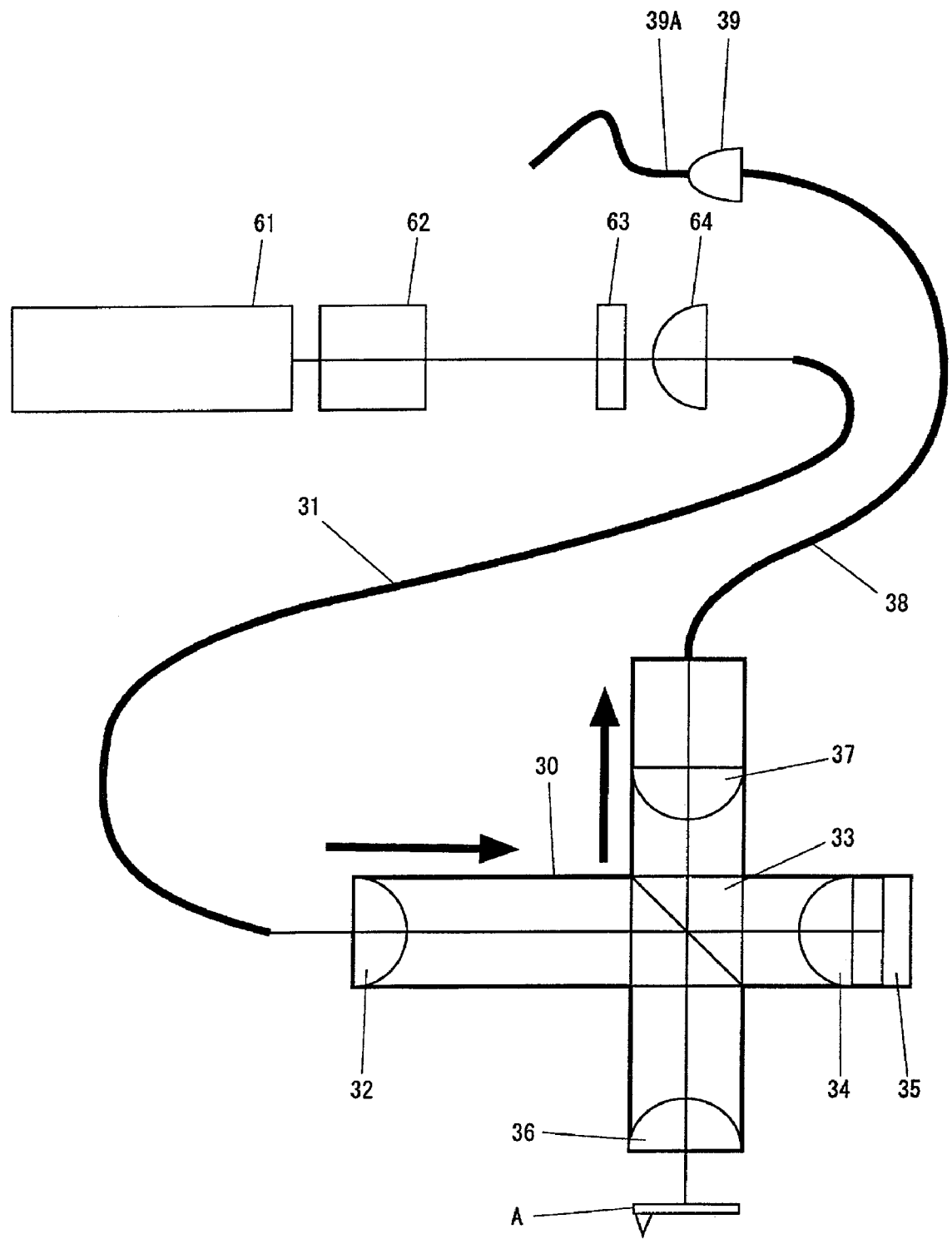
FIG. 12 is a schematic diagram of a displacement measurement system for a cantilever in a scanning force microscope corresponding to a homodyne laser interferometer probe (FIG. 8) according to the fourth embodiment of the present invention.

FIG. 12 is a schematic diagram of a displacement measurement system for a cantilever in a scanning force microscope corresponding to a homodyne laser interferometer probe (FIG. 8) according to the fourth embodiment of the present invention.

In FIG. 12, the homodyne laser interferometer probe has a construction shown in FIG. 8. Here, laser light from the laser light source 61 is guided by a first optical fiber 31 through the light isolator 62, the ½ wavelength plate 63 and the focal lens 64, and introduced into an optical probe 30. The output light from the optical probe 30 is introduced through a second optical fiber 38 into the photodiode 39, and a displacement signal is outputted by the wiring 39A.

The present invention is not limited to the above-described embodiments. Various changes and modifications can be made within the spirit and scope of the present invention, and they are not excluded from the spirit and scope of the present invention.

According to the present invention, it is possible to perform measurement by a homodyne laser interferometer having a simple structure and a high quantity of the reference light. Furthermore, by arranging a focal lens on the reference light side as well, it is possible to obtain an improved interference signal even when the angle or the installation position of an optical probe or a measurement object somewhat changes.

In addition, the present invention can provide a displacement measurement system using a low-cost homodyne laser interferometer probe of simple structure.

INDUSTRIAL APPLICABILITY

The homodyne laser interferometer probe and the displacement measurement system using the same for a cantilever in a scanning force microscope, according to the present invention, are applicable to the fields of the substance identification, nano-biomechanics, and drug discovery.

The invention claimed is:

1. A homodyne laser interferometer probe, comprising:
   (a) an optical fiber for guiding light;
   (b) a collimator lens that receives the light from the optical fiber;
   (c) a ¼ wavelength plate that receives the light from the collimator lens and converts the light from linearly polarized light to circularly polarized light;
   (d) a beam splitter for dividing the light from the ¼ wavelength plate into reference light and measurement light;
   (e) a first focal lens that receives the reference light from the beam splitter;
   (f) a reflection mirror for reflecting the reference light from the first focal lens;
   (g) an adjustment mechanism that is placed between the first focal lens and the beam splitter and that adjusts a distance between the first focal lens and the beam splitter while keeping constant a distance between the first focal lens that receives the reference light from the beam splitter and the reflection mirror that receives the reference light from the first focal lens and reflects the reference light;
   (h) a second focal lens that receives the measurement light from the beam splitter; and
   (i) a probe body that integrally incorporates therein the collimator lens, the ¼ wavelength plate, the beam splitter, the first focal lens, the reflection mirror, the second focal lens, and the adjustment mechanism, wherein
   the reference light from the reflection mirror is returned to measurement means along the same route, and wherein the measurement light from the second focal lens is applied to a measurement object and the measurement light from the measurement object is returned to the measurement means along the same route.

2. A homodyne laser interferometer probe, comprising:
   (a) an optical fiber for guiding light;
   (b) a collimator lens that receives the light from the optical fiber;
   (c) a beam splitter that receives the light from the collimator lens and that divides the light into reference light and measurement light;
   (d) a first focal lens that receives the reference light from the beam splitter;
   (e) a reflection mirror for reflecting the reference light from the first focal lens;
   (f) an adjustment mechanism that is placed between the first focal lens and the beam splitter and that adjusts a distance between the first focal lens and the beam splitter while keeping constant a distance between the first focal lens that receives the reference light from the beam splitter and the reflection mirror that receives the reference light from the first focal lens and reflects the reference light;
   (g) a second focal lens that receives the measurement light from the beam splitter;
   (h) a probe body that integrally incorporates therein the collimator lens, the beam splitter, the first focal lens, the reflection mirror, the second focal lens, and the adjustment mechanism; and
   (i) a photodetector that applies the measurement light from the second focal lens to a measurement object, that returns the measurement light reflected by the measurement object to the beam splitter, and that measures the measurement light from the beam splitter via a third focal lens, as well as measures the reference light from the reflection mirror along the same route.

3. The homodyne laser interferometer probe according to claim 2, wherein the photodetector is a photodiode.

4. The homodyne laser interferometer probe according to claim 2, wherein the photodetector is a photodiode connected to the focus part of the third focal lens, via an optical fiber.

5. The homodyne laser interferometer probe according to claim 1 or 2, wherein the adjustment mechanism is a shear piezo element.

6. The homodyne laser interferometer probe according to claim 1 or 2, wherein the adjustment mechanism consists of a shear piezo element and wedges.

7. A displacement measurement system that, using the homodyne laser interferometer probe according to claim 1, introduces the reference light and the measurement light that have been returned to the optical fiber, into an element for detecting the intensity of light that mutually interferes through the intermediary of a beam splitter, and that performs homodyne interferometer measurement using the optical path difference between the measurement light and the reference light.

8. A displacement measurement system using the homodyne laser interferometer probe according to claim 2, which performs a homodyne laser interferometer measurement by the optical path difference between the reference light and the measurement light, based on the reference light and the measurement light obtained by the photodetector.

* * * * *